(12) United States Patent
Lin et al.

(10) Patent No.: US 6,738,387 B1
(45) Date of Patent: May 18, 2004

(54) DESIGN OF SCALABLE TECHNIQUES FOR QUALITY OF SERVICES ROUTING AND FORWARDING

(75) Inventors: Ying-Dar Lin, Hsinchu (TW); Nai-Bin Hsu, Hsinchu (TW); Ren-Hung Hwang, Chiayi (TW)

(73) Assignee: National Science Council, Taipei (TW)

( * ) Notice: Subject to any disclaimer, the term of this patent is extended or adjusted under 35 U.S.C. 154(b) by 792 days.

(21) Appl. No.: 09/685,426

(22) Filed: Oct. 10, 2000

(30) Foreign Application Priority Data

Jun. 15, 2000 (TW) ........................... 89111711 A

(51) Int. Cl.[7] ............................................. H04L 12/54
(52) U.S. Cl. ..................... 370/429; 370/392; 709/232
(58) Field of Search ............................ 370/229, 351, 370/389, 392, 395.2, 395.21, 395.4, 395.41, 395.52, 419, 428, 429; 709/230, 231, 232, 233, 235

(56) References Cited

U.S. PATENT DOCUMENTS 5,790,546 A  *  8/1998  Dobbins et al. ............ 370/400
6,172,980 B1 *  1/2001  Flanders et al. ............ 370/401
6,262,976 B1 *  7/2001  McNamara .................. 370/254
6,330,602 B1 * 12/2001  Law et al. .................... 709/224
6,606,315 B1 *  8/2003  Albert et al. ................ 370/352
6,625,150 B1 *  9/2003  Yu .............................. 370/389

OTHER PUBLICATIONS

Lin QoS routing granularity in MPLS networks. IEEE Communications Magazine Jun. 2002, pp. 58–65.*

* cited by examiner

Primary Examiner—Hassan Kizou
Assistant Examiner—Dmitry Levitan
(74) Attorney, Agent, or Firm—J.C. Patents

(57) ABSTRACT

A design of scalable techniques for Quality of Service (QoS) routing and forwarding, used to reduce the blocking probability of the flow requests, and to achieve storage and computational scalability. Three techniques have been designed: 1) an overflowed cache 2) a per-class routing mark, and 3) a two-phase routing, which can be implemented individually or simultaneously. From the evaluation results of the system simulation, show that the three scalable techniques can significantly lower the blocking probability as well as the storage and computational overheads. Such advantages make the present invention to achieve the scalability for the Quality of Services routing and forwarding.

18 Claims, 10 Drawing Sheets

| Src,dst | $\pi_1$ | $\pi_2$ | ... | $\pi_m$ |
|---------|---------|---------|-----|---------|
|         |         |         | ... |         |
|         |         |         |     |         |

P-Cache       O-Cache

FIG. 1B

| Arrival rea rate (#flows/sec) | 1.0 | 1.5 | 2.0 | 2.5 | 3.0 |
|---|---|---|---|---|---|
| Per-pair | 0.03 | 0.068 | 0.107 | 0.134 | 0.168 |
| Per-flow | 0 | 0 | 0 | 0 | 0 |
| Per-pair/OC | 0 | 0 | 0 | 0 | 0 |
| Per-pair/PC | 0 | 0 | 0 | 0 | 0 |
| Per-pair/TP | 0.002 | 0.022 | 0.067 | 0.106 | 0.141 |

FIG.3

DESIGN OF SCALABLE TECHNIQUES FOR QUALITY OF SERVICES ROUTING AND FORWARDING

BACKGROUND OF THE INVENTION

1. Field of the Invention

The present invention relates to a design of scalable techniques for Quality of Services (QoS) routing and forwarding. More particularly, the present invention relates to a use of a design of scalable techniques for QoS routing and forwarding.

2. Description of the Related Art

The next generation of the Internet must provide users with diverse, fine-grain, and subjective QoS functions, particularly in light of the increasing demand for a wide spectrum of network services. Even though Resource ReSerVation Protocol (RSVP) can reserve resources for individual flows (that is, an IP packet stream between the same source-destination (S-D) pair of the session), however, current Routing Information Protocol (RIP) and the Open Shortest Path First (OSPF) protocol always find the shortest paths, and do not consider the bandwidth or other the limitations of the link. Consequently, the path may not have enough resources to provide the QoS for the flow request. In this way, RSVP reservation from the receiver could be blocked. That is, RSVP can work with RIP or OSPF to provide QoS to individual flows, however, probably with a substantially high blocking probability. Also, whenever the per-destination entry of the routing table is updated, the next hop of the associated route may be changed immediately, possibly interrupting the QoS of the flow forwarded on that path.

To reduce the blocking probability and keep stable provision during the session of a flow, QoS routing is highly desired in integrated services networks. QOSPF routing mechanism of the IETF is QoS extensions to the current OSPF, thus providing QoS path computation. During computation, QOSPF takes link bandwidth into account and the results are stored on the QoS routing table, and is used to lookup the path of a new flow request (e.g., new PATH messages of RSVP).

Moreover, for route pinning, routers can avoid oscillation and facilitate wire-speed forwarding of packets by using a forwarding cache, to record the forwarding decisions. In this way, routers usually do not need to query the QoS routing table upon packet arrival. In addition, the cache pins the forwarding path to avoid frequent change(s) which may interrupt the QoS provision.

Among the factors that affect the QoS routing performance and efficiency, granularity of the routing decision significantly affects the scalability and the blocking probability. In present day, different routing techniques use different granularities. For example, OSPF has the coarsest granularity and uses per-destination routing entries. As a request, all flows moving from different sources to a destination are forwarded to the same outgoing link on the same router. Moreover, routing granularity of MOSPF and a version of QOSPF are per-pair, i.e. based on source and the destination addresses of routed flows. In that way, all traffics of a given source and a given destination, regardless of the number of flows, travels the same route. Among the other QoS routing algorithms, such as PQC and alternate path routing, have the finest granularity, i.e per-flow. Each individual flow is routed independently.

Per-pair cache entries could result in misleading, i.e., flows following a cache entry might not find sufficient resources along the path while other paths with abundant resources still exist. This lack of resources is attributed to that flows of the same node pair use the same entry computed merely for the first existing flow between the node pair. Therefore, this path might not satisfy the bandwidth requirements of subsequent flows. Notably, the blocking probability increases when a link along the path becomes a bottleneck. On the other hand, although no such misleading occurs in the per-flow routing the cache size could be enormous. Poor scalability would ultimately result. Furthermore, due to the overhead of per-flow path computation, on-demand path-finding is hardly feasible in real networks. Therefore, path pre-computation is implemented in a version of QOSPF, which provides the results of computational cost and protocol overhead in QoS routing. In sum, QOSPF has the strength in low blocking probability and scalability in path computation. However, in wire-speed forwarding routers, per-flow forwarding of QOSPF loses storage scalability, from the perspective of the size of the forwarding cache.

SUMMARY OF THE INVENTION

The invention provides three scalable techniques for QoS routing and forwarding: 1) Overflowed cache technique-the mechanism provides three different granularities within the routing/forwarding cache. 2) Per-class routing mark technique—the mechanism computes several alternate routes between each source-destination (S-D) pair. 3) Two-phase routing technique—this mechanism provides a soft-reservation concept in order to reduce the misleading probability in the per-pair routing/forwarding cache. Hence, these QoS routing techniques not only routes data flows with quality of services (QoS), but also fast forwards data packets, reduces the blocking probability, and achieves storage and computational scalability.

As embodied and broadly described herein, the invention provides a design for a Quality of Services routing and forwarding with scalability, which includes three techniques: overflowed cache, per-class routing mark and two-phase routing, wherein the three techniques can be simultaneous or individual implemented.

The cache of the overflowed cache technique can be divided into three parts: a per-pair P-Cache, a per-flow O-Cache, and a per-destination D-Cache. When a data or control packet arrives a QoS router, the process in which the packet is forwarded, can be detailed as the following steps:

1. First, when the packet arrives at a router, the source-destination IP addresses, source-destination port numbers and protocol identification in the packet header are used to distinguish data packet and control packet;
2. If the packet is a control packet, forwards it to the control module to process and update the flow state database (FSDB), refresh the flow state if the packet belongs to existing flows. Otherwise, the P-Cache and the residual bandwidth database (RBDB) are examined;
3. If it is a best effort data packet, forwards it to the next-hop router by looking up the per-destination D-Cache whose shortest paths entries are pre-computed; and
4. If it is a QoS data packet, the O-Cache, the P-Cache and the D-Cache are simultaneously looked up. The packet is forwarded to the next hop router according to the O-Cache entry if the O-Cache lookup is a hit. Otherwise, the packet is forwarded according to the P-Cache entry if the P-Cache lookup is a hit. If both lookups are misses, the packet is forwarded according to the D-Cache entry.

The above-described examines the P-Cache and the RBDB must perform the following steps:
1. Source-destination addresses of the packet are used to lookup the P-Cache entries;
2. If the P-Cache lookup is a hit, then a request bandwidth b is checked with the RBDB to ensure the QoS of the new flow. If the check is successful, then the bandwidth is temporarily reserved for the new flow, and the flow will be forwarded according to the path on the P-Cache entry. On the other hand, if RBDB indicates that the residual bandwidth is not enough, the path computation function is invoked to find a QoS path based on the information in LSDB and RBDB. If a QoS path v is found, the forwarding information of this new flow is stored in the O-cache, i.e. overflowed to the O-cache. If no path can be found, the flow is blocked;
3. If the P-Cache lookup is a miss, this implies that no forwarding information is stored for the new flow. Therefore, the routing algorithm attempts to compute a QoS path. If the path σ is found, the algorithm stores the forwarding information in the P-cache. Otherwise, it blocks the flow.

As for the per-class routing mark technique, its implementation is as follows:
1. First, when the packet arrives at a router, the source-destination IP addresses, source-destination port numbers and protocol identification in the packet header are used to distinguish data packet and control packet;
2. If it is a control packet, forwards it to the control module to process and update the flow state database (FSDB). Note that in case of edge router and the flow is a new request, the C-Cache (i.e. O-Cache and P-Cache combination) and the residual bandwidth database (RBDB) are examined. That is, the algorithm uses the source-destination addresses of the control packet to extract the least costly
feasible path π and the index of sub-entry m from the C-Cache. According to the number of sub-entries of the desired S-D pair, three cases will be further discussed;
3. If it is a best effort data packet, forwards it to the next-hop router by looking up the per-destination D-Cache whose shortest paths entries are pre-computed; and
4. If it is a QoS data packet, indexing the S-D address pair and routing mark simultaneously look up the C-Cache and the D-Cache. The packet is forwarded to the next hop router according to the C-Cache entry if the C-Cache lookup is a hit. Otherwise, the packet is forwarded according to the D-Cache entry. Note that in case of edge router, the routing mark must be retrieved from the flow state database and insert it into the packet header, then forwards the packet to the next hop router.

The three above-described cases are:
1. If the number of sub-entries of the desired S-D pair in C-Cache is 'empty', the lookup will be missed and the algorithm attempts to compute the least costly feasible path, termed σ. If σ is found, the algorithm assigns a new mark to σ, inserts it into the C-Cache, and then updates the flow state database. If σ is not found, the flow is blocked;
2. If the number of sub-entries of the desired S-D pair in C-Cache is 'full', this algorithm simply finds the least costly feasible path n among the existing Π(s, d) paths, where π∈Π(s, d). If π is found, the flow will be marked with the index of π, and thus update the flow state database. If π is not found, then blocks the flow; and
3. If the number of sub-entries of the desired S-D, Π(s, d), is neither empty nor full, this algorithm can either route the flow through the π led by the C-Cache as in case 2, or route the flow through a newly computed path σ as in case 1, whichever costs less. Note that no matter which is chosen, the flow state database is updated with the desired routing mark.

Furthermore, the path computation module may use a two-phase routing technique. When a data or control packet arrives a QoS router, the process in which the packet is forwarded, can be detailed as the following steps:
1. First, when the packet arrives at a router, the source-destination IP addresses, source-destination port numbers and protocol identification in the packet header are used to distinguish data packet and control packet;
2. If the packet is a control packet, forwards it to the control module to process and update the flow state database (FSDB), refresh the flow state if the packet belongs to existing flows. Otherwise, use the S-D pair addresses to lookup the P-Cache and the residual bandwidth database (RBDB) is examined.
3. If it is a best effort data packet, forwards it to the next-hop router by looking up the per-destination D-Cache whose shortest paths entries are pre-computed; and
4. If it is a QoS data packet, the P-Cache and the D-Cache are simultaneously looked up. The packet is forwarded to the next hop router according to the P-Cache entry if the P-Cache lookup is a hit. Otherwise, the packet is forwarded according to the D-Cache entry.

Use of the S-D address pair to lookup the P-Cache includes implementing the following steps:.
1. If the P-Cache lookup is a hit, and the feasibility check with RBDB is successful (i.e., with enough residual bandwidth), then the flow will be forwarded through the path led by the P-Cache. If there is not enough residual bandwidth, then the flow is blocked;
2. If the P-Cache lookup is a miss, this implies that no forwarding information is stored for the new flow. Therefore, the two-phase routing technique is used to compute a feasible QoS path. If the path σ is found, the algorithm stores the forwarding information in the P-cache. Otherwise, it blocks the flow.

Moreover, the path computation module is based on the following two-phase computation:
1. Phase-I, referred to as soft-reservation, tries to find a path $\sigma_1$ with greater bandwidth than the request b, i.e. where width($\sigma_1$)≧b+$b_{more}$. The $b_{more}$ value can be roughly estimated and can be adjusted according to the traffic volume. Path information of $\sigma_1$ is inserted into the P-Cache, and the soft-residual bandwidth is recorded into the soft-RBDB database. Consequently, the subsequent incoming flows of the same S-D pair will be more likely to successfully reserve bandwidth on the minimum-hop path $\sigma_1$. Less misleading will increase the likelihood of success; and
2. If a QoS path $\sigma_1$ cannot be found, Phase-II will attempt to compute a path $\sigma_2$ with bandwidth b, i.e., width($\sigma_2$) ≧b, referred to as hard-reservation because it considers the actual required bandwidth. Path information of $\sigma_2$ is inserted into the P-Cache, and the hard-residual bandwidth is recorded into the hard-RBDB database. If QoS path $\sigma_2$ cannot be computed, the flow is blocked.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention, and, together with the description, serve to explain the principles of the invention. In the drawings, FIGS. 1A and 1B are illustrations of the design of scalable techniques for QoS routing and forwarding according to a first preferred embodiment of the present invention; the components are 10) FSDB—Flow State Database;
12) LSDB—Link State Database, RBDB—Residual Bandwidth Database;
14) O-Cache—Overflowed Cache;
16) P-Cache—per-pair Cache;
18) D-Cache—per-destination Cache;
20) QoS packet;
22) CM—Control Module;
24) Path computation module;
26) Routing table;
28) Control packet;
30) BE—Best Effort packet;

FIG. 3 is an illustration of a comparison of the cache misleading probabilities;

DESCRIPTION OF THE PREFERRED EMBODIMENTS

Figure 1A:
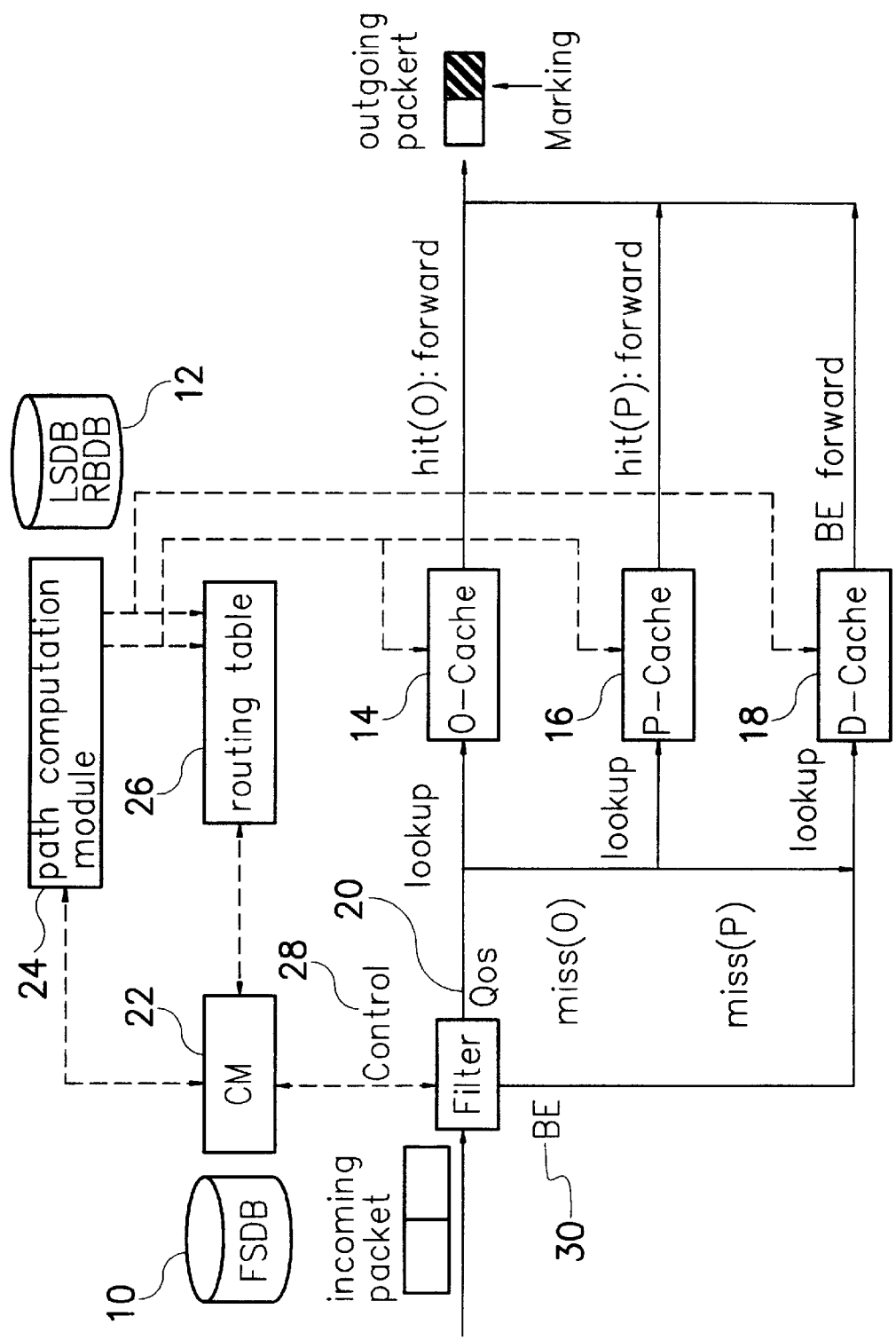

In order to achieve a blocking probability as low as that of the per-flow, and as good as the scalability of the per-pair, three scalable techniques have been designed, and are briefly described in the following:

1. A routing/forwarding cache retrieval technique, called overflowed-cache (expressed as per-pair/OC), divides the cache into a per-pair P-Cache, an overflowed per-flow O-Cache, and a per-destination D-Cache. The O-Cache is created when a new flow arrives and cannot find sufficient bandwidth on the path of P-Cache. That is, if the P-Cache lookup for the new request is a hit, a resource availability check must be made to ensure the QoS of the new flow. If the check is successful, this flow is routed according to the P-Cache. If the check fails, the path computation is invoked to find a QoS path and the routing information is stored in the O-Cache, i.e. overflowed to the O-Cache. If no QoS path can be found, the new flow is blocked.

2. In order to simplify the QoS routing packet forwarding process, especially in the core network. When a flow request with QoS requirement arrives, it is routed to the 'best' path given the current network state. The best path is defined as the least costly feasible path. Consequently, flows between an S-D pair may be routed on several different paths. However, flows routed on the same path between an S-D pair are forwarded identically at intermediate routers. Therefore, flows can be aggregated into the same routing class and marked accordingly at source or edge routers (such technique is expressed as per-pair/PC). Notably, flows of the same routing class may require different qualities of service. The core router in a Differentiated Services domain uses the routing mark to determine which output port (interface) a packet should be forwarded to and, then, uses the DS codepoint to determine the service class, i.e. Per-Hop Behavior. By limiting the number of routing marks, the routing algorithm would route flows along a limited number of paths between each S-D pair. Route pinning is enforced by coding packets of the same flow. The forwarding process at intermediate or core routers is simplified by checking the source, destination, and routing mark fields.

3. Intuitively, QoS flow locality exists between node pairs as in circuit-switched networks. The likelihood of new flow arriving between a node pair with existing flows should be greater than when the node pair has no flows. Consequently, we have provided a two-phase routing technique (expressed as Per-pair/TP). This mechanism mainly provides a concept of soft-reservation to reduce the misleading probability of the per-pair cache.

In the evaluation results of the system simulation, we found that the overflowed cache technique actually has a relatively lower blocking probability than the single per-pair granularity routing mechanism. Also, the overflowed cache technique has a less path computation and storage cost than the per-flow routing. In addition, simulation results indicate that the per-class routing mark technique with a small number of routing marks Oust 2 or 3) is competitive compared to a routing algorithm that routes flow independently. Moreover, the blocking probability of per-class routing is less than the per-pair mechanism. And the last technique, two-phase routing, has a load balancing effect. Since this technique forces flows of other S-D pairs to detour from the set of potential bottlenecks.

Simulations are run on 40-node random graphs and the average degree of nodes in these graphs is in the range [3.5, 5]. Each link is assumed to be OC-3 with 155 Mbps, which is the ATM infrastructure adopted by many Internet backbones this study assumes that there are two types of QoS traffic: $GS_1$ and $GS_2$. $GS_1$ models video sources where the bit rate is set to 128 Kbps, for example videoconference, while $GS_2$ models voice source where the rate is set to 16 Kbps. The ratio of the arrival rate of $GS_1$ to $GS_2$ is 1:4. Flow arrival process is assumed to be independent at each node, following an ON-OFF model with exponentially active and idle periods. A flow's holding time is assumed to be exponentially distributed with mean $\mu$. The mean holding time used herein is 10 minutes for $GS_1$ sessions, and 3 minutes for $GS_2$ sessions. A flow request F from s to d whose bandwidth requirement b cannot be satisfied is blocked and departs without further affecting the system.

For further clarification, refer to FIG. 1A, an illustration of a design of scalable techniques for QoS routing and forwarding, according to a first preferred embodiment of the present invention. The state of each flow is established through the QoS signaling protocol and admission control and the related information will be stored on the FSDB[10]. As the OSPF routing protocol, this design uses reliable flooding to exchange link state information and enables all routers to construct the same LSDB[12] and RBDB[2].

Next, FIG. 1A is used to explain the process of the overflowed cache technique, wherein the forwarding cache is divided into three parts: an O-Cache[14] with the per-flow or per-class granularity, a P-Cache[16] with per-pair granularity, and a D-Cache[18] with a per-destination granularity. When a data or control packet arrives a QoS router, the source-destination addresses, source-destination port numbers and protocol identification in the packet header are used to distinguish data packet and control packet.

The process can be detailed as the following steps:

1. If the packet is a control packet[28], forwards it to the control module (CM[22]) to process and update the flow state database (FSDB[10]), refresh the flow state if the packet belongs to existing flows. Otherwise, as shown in Table 1, the P-Cache[16] and the residual bandwidth database (RBDB[12]) are examined;
   (a) Source-destination addresses of the packet are used to lookup the P-Cache entries;
   (b) If the P-Cache lookup is a hit, then a request bandwidth b is checked with the RBDB to ensure the QoS of the new flow. If the check is successful, then the bandwidth is temporarily reserved for the new flow, and the flow will be forwarded according to the path on the P-Cache entry. On the other hand, if RBDB indicates that the residual bandwidth is not enough, the path computation function is invoked to find a QoS path based on the information in LSDB and RBDB. If a QoS path $\sigma$ is found, the forwarding information of this new flow is stored in the O-cache, i.e. overflowed to the O-cache. If no path can be found, the flow is blocked;
   (c) If the P-Cache lookup is a miss, this implies that no forwarding information is stored for the new flow. Therefore, the routing algorithm attempts to compute a QoS path. If the path $\sigma$ is found, the algorithm stores the forwarding information in the P-cache. Otherwise, it blocks the flow.

2. If it is a best effort data packet[30], forwards it to the next-hop router by looking up the per-destination D-Cache[18] whose shortest paths entries are pre-computed; and 3. If it is a QoS data packet[20], the O-Cache[14], the P-Cache[16] and the D-Cache[18] are simultaneously looked up. The packet is forwarded to the next hop router according to the O-Cache entry if the O-Cache lookup is a hit. Otherwise, the packet is forwarded according to the P-Cache entry if the P-Cache lookup is a hit. If the both lookups are misses, the packet is forwarded according to the D-Cache entry.

TABLE 1

Per_Pair_OC algorithm in overflowed cache technique

Per_Pair_OC(F, s, d, b, D)
Flow_request F; // from s to d with requirement b and D path $\sigma$;

TABLE 1-continued

Per_Pair_OC algorithm in overflowed cache technique

Figure 1B:
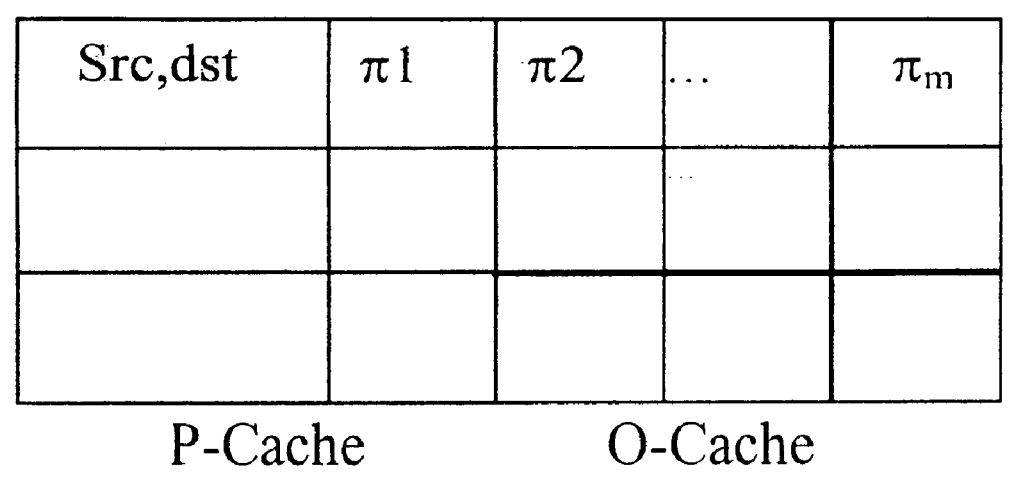

Begin
    case miss(P-cache):
        $\sigma \leftarrow$ FindRouteLeastCost(s, d, b, D)
        if($\sigma$ found)
            insert(P-cache), route(F) through $\sigma$
        else "path not found"
    case $\sigma \leftarrow$ hit(P-cache):
        if (width($\sigma$)$\geq$b) and (length($\sigma$)$\leq$D)
            route(F) through $\sigma$,
        else  // overflow
           Begin
              $\sigma \leftarrow$ FindRouteLeastCost(s, d, b, D)
              if($\sigma$ found)
                  insert(O-cache), route(F) through $\sigma$
              else "path not found"
           End
End As for the per-class routing mark technique, FIG. 1B shows the format of the C-cache which provides a maximum of m feasible routes per node pair. The C-cache can be implemented as the combination of the above-described P-cache and O-cache.
Details of the technique is as follows:

1. First, when the packet arrives at a router, the source-destination IP addresses, source-destination port numbers and protocol identification in the packet header are used to distinguish data packet and control packet;

2. If it is a control packet[28], forwards it to the control module to process and update the flow state database (FSDB[10]). Note that in case of edge router and the flow is a new request, the C-Cache[14+16] and the residual bandwidth database (RBDB[12]) are examined. That is, the algorithm uses the source-destination addresses of the control packet to extract the least costly feasible path $\pi$ and the index of sub-entry m from the C-Cache. According to the number of sub-entries of the desired S-D pair, as shown in Table 2, three cases will be further discussed;
   (a) If the number of sub-entries of the desired S-D pair in C-Cache is 'empty', the lookup will be missed and the algorithm attempts to compute the least costly feasible path, termed $\sigma$. If $\sigma$ is found, the algorithm assigns a new mark to $\sigma$, inserts it into the C-Cache, and then updates the flow state database. If $\sigma$ is not found, the flow is blocked;
   (b) If the number of sub-entries of the desired S-D pair in C-Cache is 'full', this algorithm simply finds the least costly feasible path $\pi$ among the existing $\Pi$(s, d) paths, where $\pi \in \Pi$(s, d). If $\pi$ is found, the flow will be marked with the index of $\pi$, and thus update the flow state database. If $\pi$ is not found, then blocks the flow; and
   (c) If the number of sub-entries of the desired S-D, $\Pi$(s, d), is neither empty nor full, this algorithm can either route the flow through the $\pi$ led by the C-Cache as in case 2, or route the flow through a newly computed path C as in case 1, whichever costs less. Note that no matter which is chosen, the flow state database is updated with the desired routing mark.

3. If it is a best effort data packet[30], forwards it to the next-hop router by looking up the per-destination D-Cache[18] whose shortest paths entries are pre-computed; and 4. If it is a QoS data packet[20], indexing the S-D address pair and routing mark simultaneously on the C-Cache and the D-Cache. The packet is forwarded to the next hop router according to the C-Cache entry if the C-Cache lookup is a hit. Otherwise, the packet is forwarded according to the D-Cache entry. Note that in case of edge router, the routing mark must be retrieved from the flow state database and insert it into the packet header, then forwards the packet to the next hop router.

TABLE 2

Per_Pair_PC algorithm in per-class routing mark technique

```
Per_Pair_PC(F, s, d, b, D)
Flow_request F;    //from s to d with requirement b and D
Cache entry Π(s, d);
Select_path π;
Compute_path σ;
Begin
    initiate cost(NULL)=∞;
    choose π∈Π(s, d) that cost(π) is the least & width(π) ≧ b
        case miss(C-cache)://empty
            σ←FindRouteLeastCost(s, d, b, D)
            if(σ not found)
                "path not found"
            else
                insert(Π(s, d)), mark(F) & route(F) through σ
        case (Π(s, d) is full):
            if (π not found)
                "path not found"
            else
                mark(F) & route(F) to π
        case (empty < Π(s, d) < full):
            σ←FindRouteLeastCost(s, d, b, D)
            if (σ & π not found)
                "path not found"
            if (cost(σ) > cost(π))
                mark(F) & route(F) to π
            else
                insert(Π(s,d)), mark(F) & route(F) through σ
End
```

Next, the path computation module uses a two-phase routing technique will be described. QoS flow locality exists between node pairs as in circuit-switched networks. The likelihood of new flow arriving between a node pair with existing flows should be greater than when the node pair has no flows. Restated, the probability of a flow arrival between node i and node j, $\phi_{ij}$ could be a function of the number of existing flows between these two nodes, i.e. $\phi_{ij}=f(n_{ij})$, where $n_{ij}$ is the number of existing flows between node i and node j. Based on this assumption, this technique introduces the soft reservation concept to reduce the probability of the cache misleading. The scheme reserves a block of bandwidth that exceeds the bandwidth requirement of a flow when the first flow between an S-D pair is established. When loading along a path reaches a certain level of the link capacity, two-phase routing forces flows of other S-D pairs to detour from the set of potential bottlenecks.

When a data or control packet arrives a QoS router, the process in which the packet is forwarded, can be detailed as the following steps:

1. First, when the packet arrives at a router, the source-destination IP addresses, source-destination port numbers and protocol identification in the packet header are used to distinguish data packet and control packet;
2. If the packet is a control packet[28], forwards it to the control module (CM[22]) to process and update the flow state database (FSDB[10]), refresh the flow state if the packet belongs to existing flows. Otherwise, use the S-D pair addresses to lookup the P-Cache and the residual bandwidth database (RBDB[12]) is examined.
    (a) If the P-Cache[16] lookup is a hit, and the feasibility check with RBDB is successful (i.e., with enough residual bandwidth), then the flow will be forwarded through the path led by the P-Cache. If there is not enough residual bandwidth, then the flow is blocked;
    (b) If the P-Cache[16] lookup is a miss, this implies that no forwarding information is stored for the new flow. Therefore, the two-phase routing technique is used to compute a feasible QoS path. If the path a is found, the algorithm stores the forwarding information in the P-cache. Otherwise, it blocks the flow.
3. If it is a best effort data packet[30], forwards it to the next-hop router by looking up the per-destination D-Cache whose shortest paths entries are pre-computed; and
4. If it is a QoS data packet[20], the P-Cache[16] and the D-Cache [18] are simultaneously looked up. The packet is forwarded to the next hop router according to the P-Cache entry if the P-Cache lookup is a hit. Otherwise, the packet is forwarded according to the D-Cache entry.

As shown in Table 3, the path computation module[26] in FIG. 1A is based on the following two-phase computation:
    (a) Phase-I, referred to as soft-reservation, tries to find a path $\sigma_1$ with greater bandwidth than the request b, i.e. where width($\sigma_1$)≧b +$_{more}$. The b$_{more}$ value can be roughly estimated and can be adjusted according to the traffic volume. Path information of $\sigma_1$ is inserted into the P-Cache, and the soft-residual bandwidth is recorded into the soft-RBDB database. Consequently, the subsequent incoming flows of the same S-D pair will be more likely to successfully reserve bandwidth on the minimum-hop path $\sigma_1$. Less misleading will increase the likelihood of success; and
    (b) If a QoS path $\sigma_1$ cannot be found, Phase-II will attempt to compute a path $\sigma_2$ with bandwidth b, i.e., width($\sigma_2$)≧b, referred to as hard-reservation because it considers the actual required bandwidth. Path information of $\sigma_2$ is inserted into the P-Cache, and the hard-residual bandwidth is recorded into the hard-RBDB database. If QoS path $\sigma_2$, cannot be computed, the flow is blocked.

To evaluate the effectiveness of two-phase routing alone, this study uses a simple flow locality model to model the distribution of flow destination. This model assumes that the more flows exist between a node pair (s, d), the greater the chance of a new flow between (s, d) arriving. Therefore this research defines the flow-arrival intensity of node pair (s, d) with a normalized probability, as $$\varphi_{sd} = \frac{(\alpha \cdot n_{sd} + 1)}{\sum_{k \neq s}(\alpha \cdot n_{sk} + 1)}.$$

This is for a specific source node s, where $n_{sd}$ is the number of existing flows between node s and node d, and $0 \leq \alpha$ is the degree of non-uniformity. $\alpha=0$ becomes the uniform case.

TABLE 3

Path computation in two-phase routing technique

```
path FindRouteTwoPhase(F, s, d, b, D)
Flow_request F;    // from s to d with requirement b and D
path σ₁, σ₂;
```

TABLE 3-continued

Path computation in two-phase routing technique

```
Begin
    σ₁←FindRouteLeastCost(s, d, b+b_more,D)//phase-I
    // soft_reserve(b+b_more)from soft-Database
    if(σ₁ found)
        return(σ₁)
    else
        Begin
        σ₂←FindRouteLeastCost(s, d, b, D)//phase-II
        // hard_reserve(b) from hard-Database
        if(σ₂ found)
            return(σ₂)
        else "path not found"
        End
End
```

Figure 2:
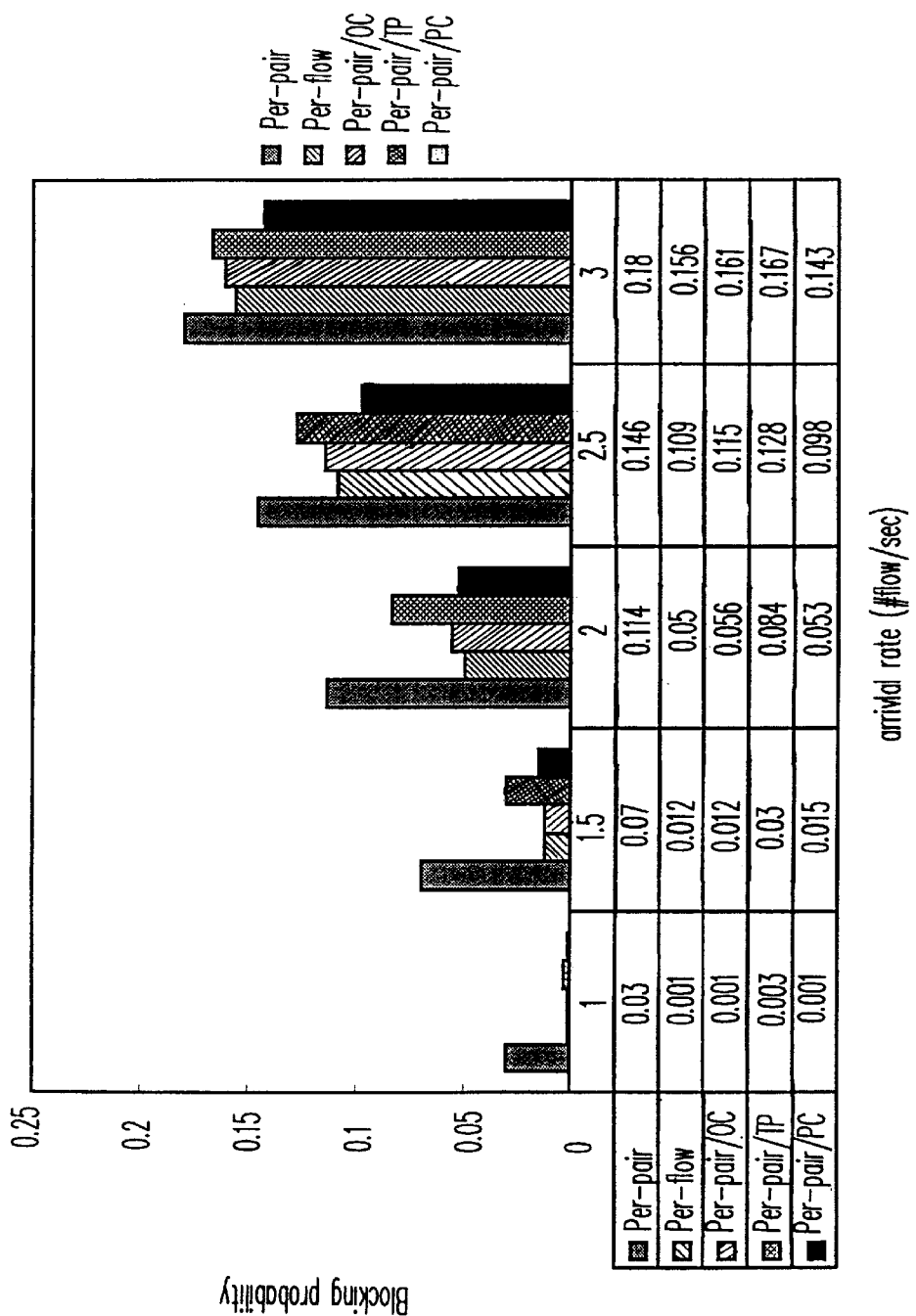
FIG. 2 is an illustration of the blocking probabilities created by five types of forwarding mechanisms with different granularities.

FIG. 2 shows the blocking probabilities of various routing mechanisms based on different cache granularities, and FIG. 3 shows the cache misleading probability. As expected, the finest granularity, per-flow caching, results in the lowest blocking probability when the arrival rate is 1 and 1.5 flows/sec. Overflowed cache (Per-pair/OC), per-pair cache with two-phase routing (Per-pair/TP), and per-class routing mark (Per-pair/PC) perform similarly to per-flow caching, and do much better than per-pair caching. Since the per-pair caching is based on a given source and a given destination, regardless of routed flows, travels the same route. Consequently, the successive flows might not obtain enough bandwidth, thereby causing the high blocking probability and high cache misleading. Conversely, since the per-flow cache individually processes the route of each flow, therefore, the blocking probability is quite low, and does not cause cache-misleading probability.

Figure 4:
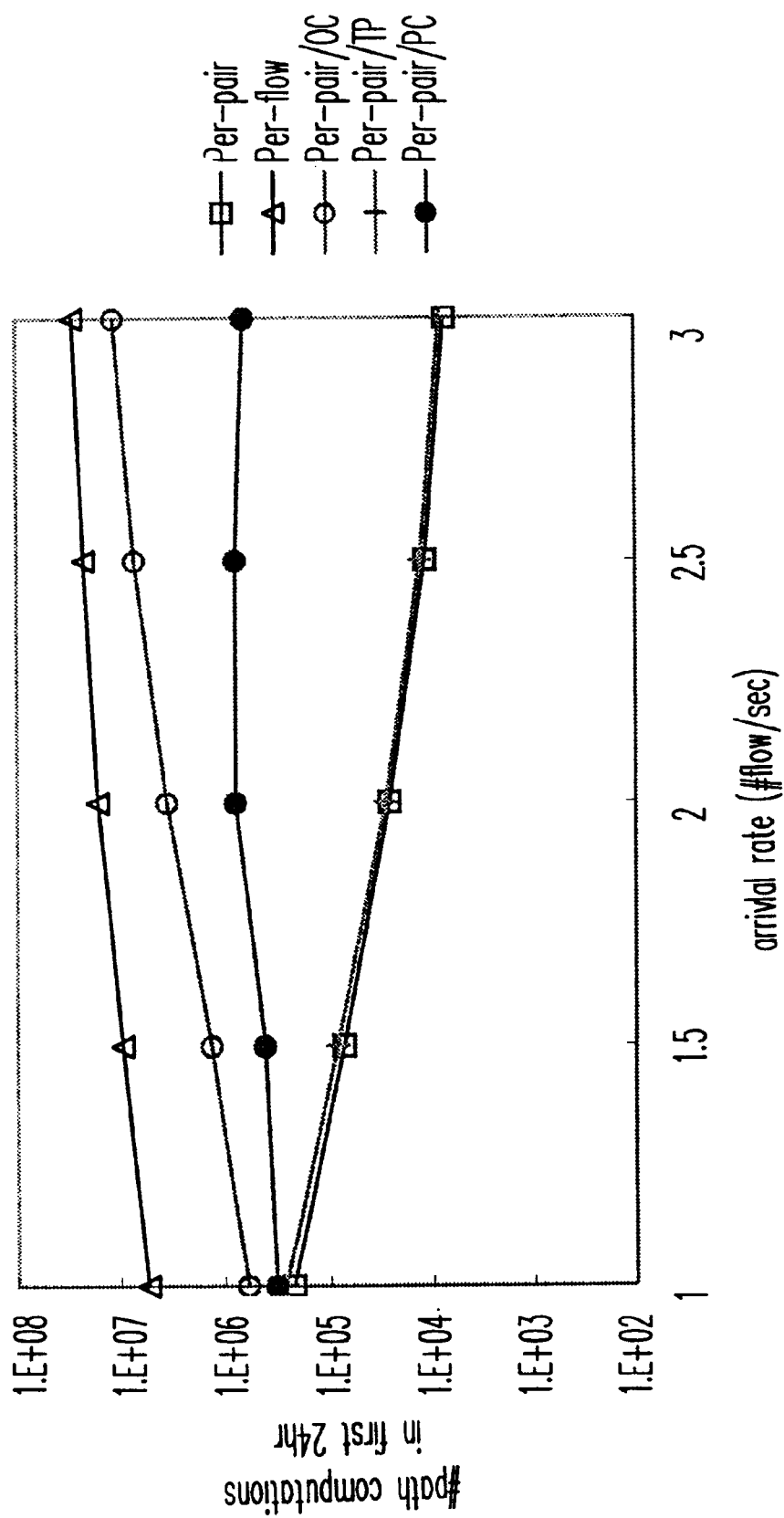
FIG. 4 is an illustration of a comparison of the number of path computations.

FIG. 4 gives a snapshot of comparing of the number of path computations in a twenty-four hours period of various schemes. This metric primarily evaluates the computational cost and the results are plotted on a semi-logarithmic scale. Obviously, per-pair is the lower bound since there is a greater percentage of succeeding flow requests do not invoke path computation. These flows simply look up the forwarding cache to make routing and forwarding decisions. On the other hand, per-flow is the upper bound, since every flow request requires path computation, the number of path computations increased with the offered load. Note that due to the P-Cache is implemented in per-pair/OC and per-pair/PC, their numbers of computations are significant reduced.

Figure 5:
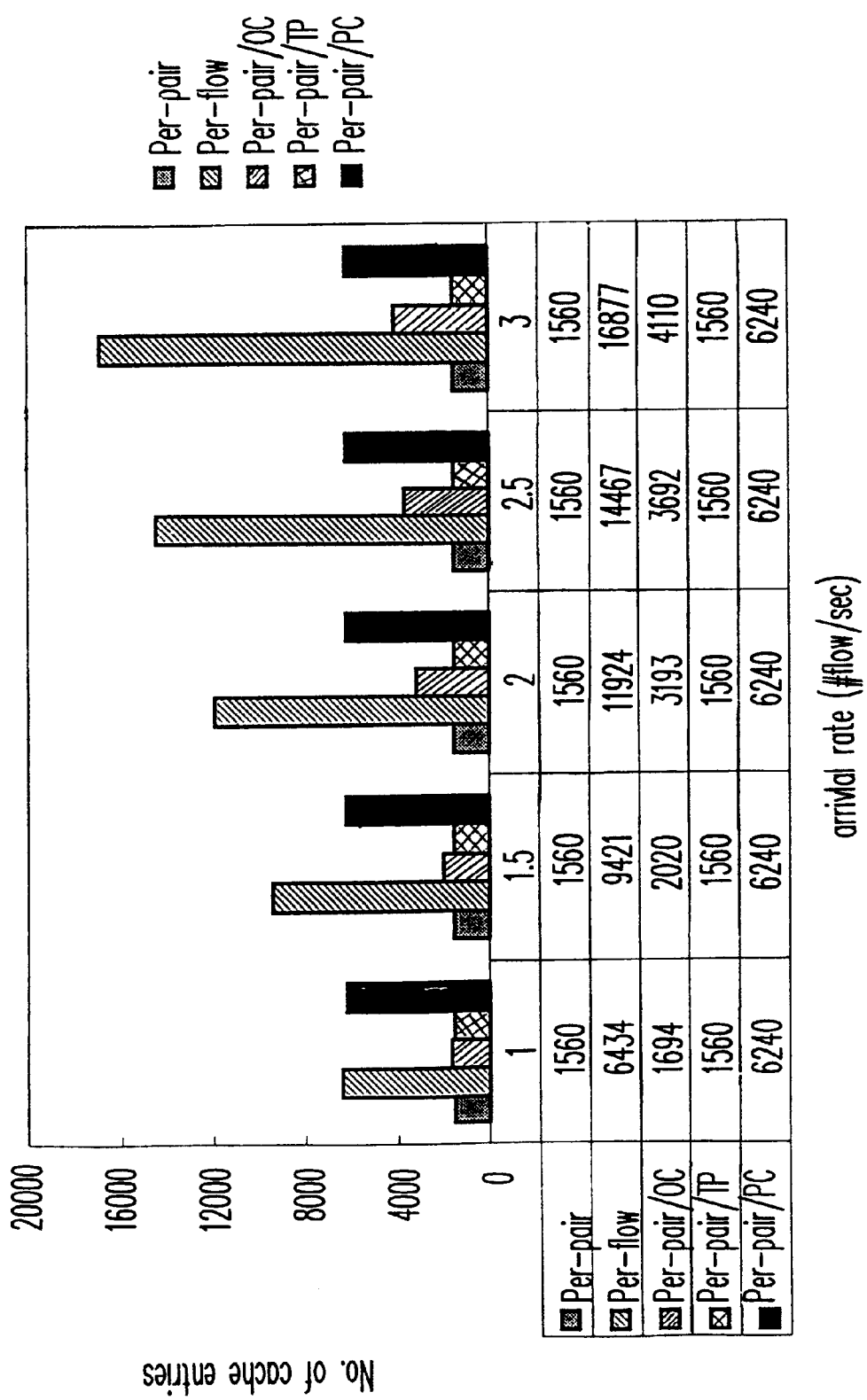
FIG. 5 is an illustration of a comparison of the number of cache entries.
Figure 6:
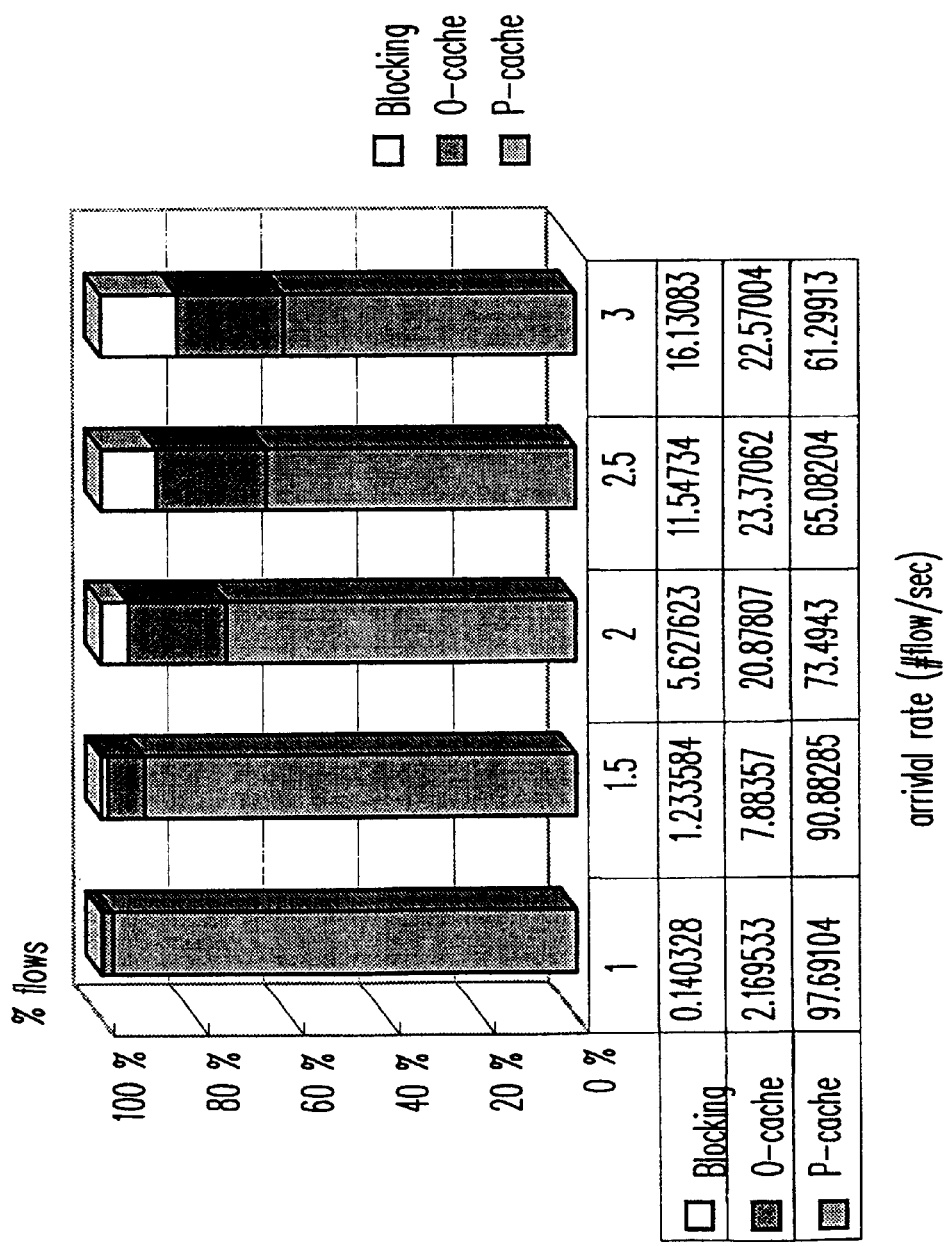
FIG. 6 is an illustration of the ratio of cache overflowed and non-overflowed.

FIG. 5 gives the maximum cache size per node. It indicates that the cache size of the Per-pair, Per-pair/TP and Per-pair/PC schemes remain almost constant regardless of traffic loading. On the other hand, the cache sizes of Per-flow, Per-pair/OC, and Per-pair/OCTP increase as the traffic load increases. FIG. 6 indicates the ratio of the routing decision extracted from the P-Cache or O-Cache, and the ratio of blocking flows. Obviously, most routing decision of the flows can be successfully extracted from the P-Cache. Even under the heavy load, the part of overflowed cache only takes up with 23%

Figure 7:
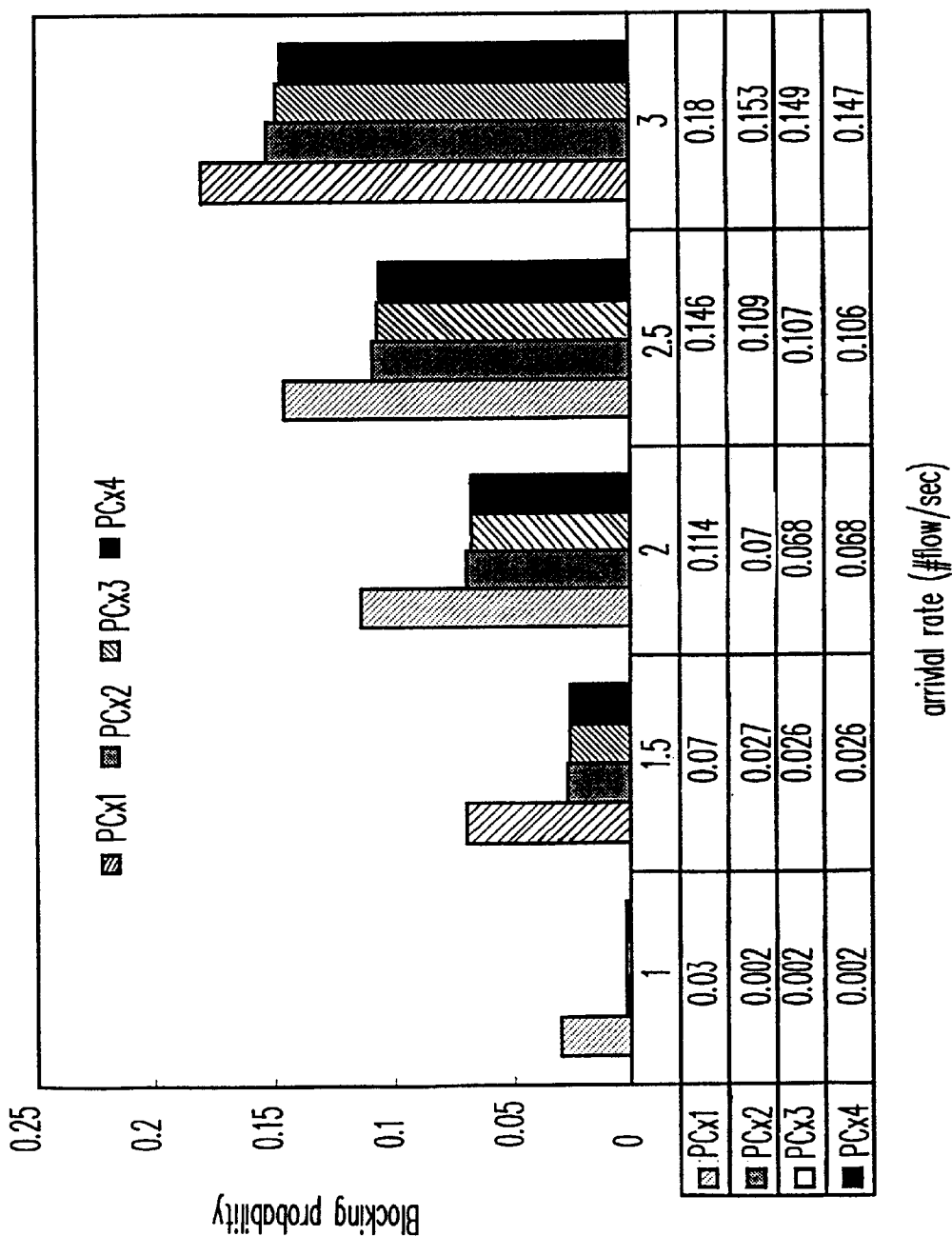
FIG. 7 is an illustration of a comparison of the blocking probabilities of the per-class routing technique with different number of marks.

FIG. 7 shows the effectiveness of different numbers of routing classes, m, in Per-pair/PC. When m=1, all flows between the same S-D pair share the same path, just as with Per-pair. When m=2, Per-pair/PC shows its most significant improvement, but there is very little improvement when m≧3. The simulation results reveal that the Per-pair/PC can yield a good performance with only a very small number of routing marks.

Figure 8:
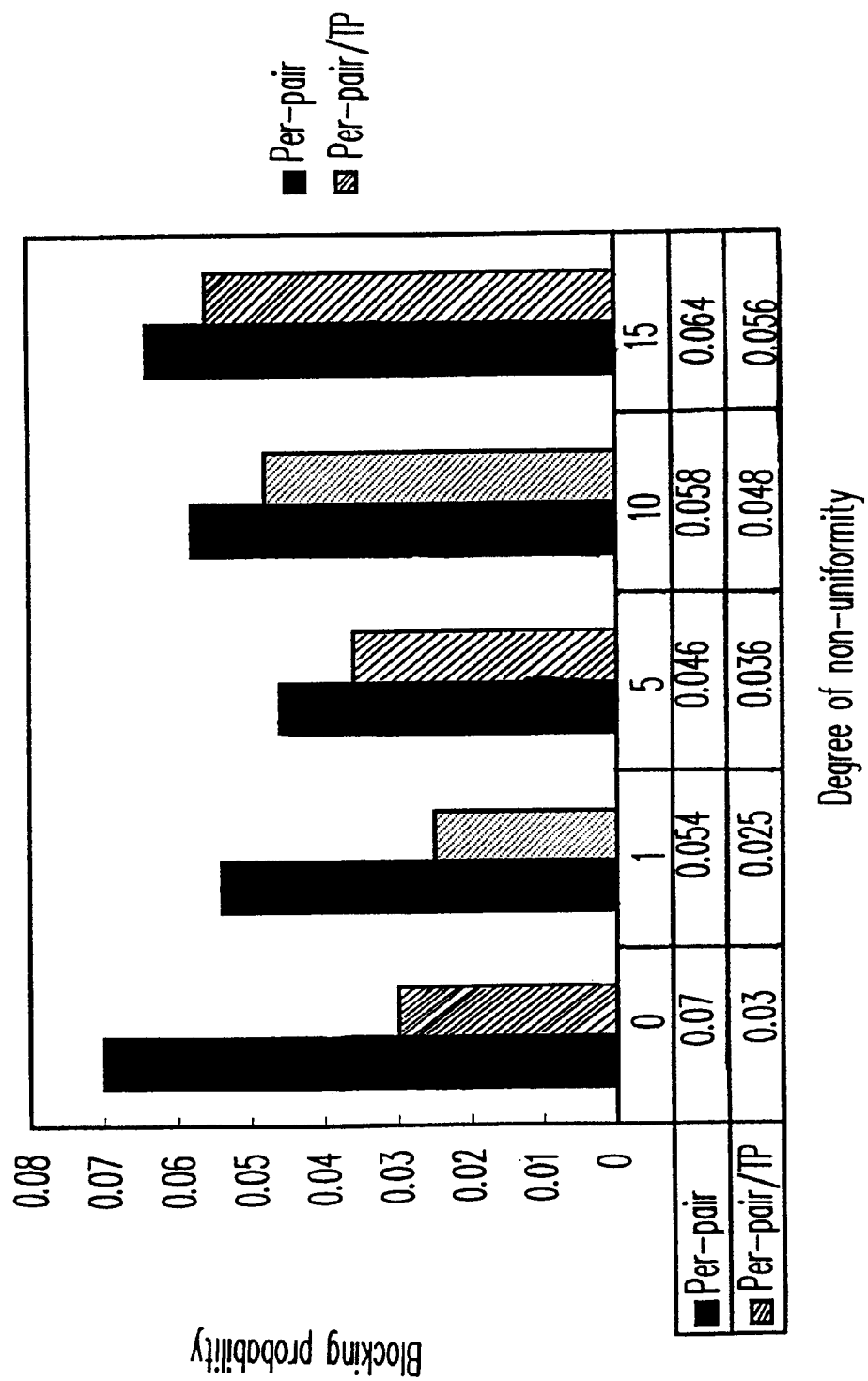
FIG. 8 is an illustration of the effects that the two-phase routing technique reduces the blocking probability.
Figure 9:
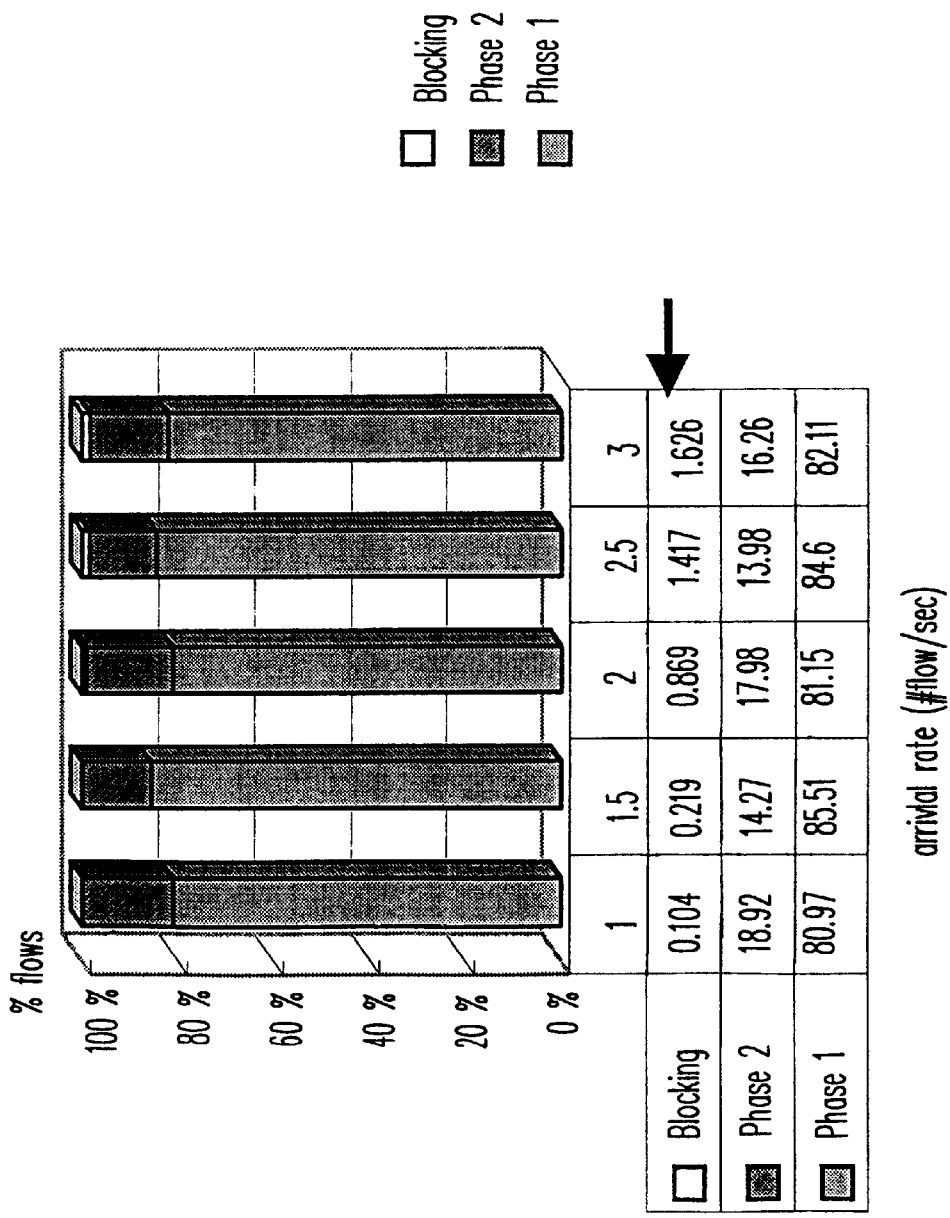
FIG. 9 is an illustration indicating the ratio of the number of path computations in Phase-II in the two-phase routing technique.

FIG. 8 reveals that the blocking probabilities of Per-pair/TP are lower than purely Per-pair, and also achieve a degree of load balancing since this technique forces flows of other S-D pairs to detour from the set of potential bottleneck links. Note that the little or medium flow locality favors the performance of both Per-pair and Per-pair/TP. But as degree of non-uniformity, α, increases beyond a certain degree, per-pair/TP is ineffective in detouring the over-skewed traffic. FIG. 9 indicates that when soft-reserve bandwidth $b_{more}$ is 1024 Kbps, the proportions of routing paths are computed in phase-I or phase-II. As a result, the ratio of the phase-II computation does not exceed 19%. Hence, the two-phase routing does not increase the cost of the path computation by much, but rather, reduces the blocking probability by 12% to 57%, as shown in FIG. 8.

In summary of the above, the special characteristics in the present invention are: an overflow cache technique (per-pair/OC), a per-class routing mark technique (per-pair/PC), and a two-phase routing technique (per-pair/TP). The present design techniques fast-forwards packets and prevent the cache misleading, that is, it provides the opportunity to find another feasible route. In this way, not only the blocking probability is reduced, but also the storage and path computational scalabilities are achieved. By contrast to the per-pair routing, the present invention may cost an extra cache lookup and the storage of the O-Cache. At present, however., a cache lookup could be completed in about 100 ns. And the size of O-Cache is smaller than $cn^2$, and the complexity of the computation method still maintains $O(n*e)$, wherein n is the number of nodes, e is the number of the links and c is a constant related to the network traffic. Simulation result shows that the c is from about 1–3.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A design of scalable techniques for Quality of Services (QoS) routing and forwarding, using an overflowed cache technique, wherein the forwarding cache can be divided into three parts: a per-pair P-Cache, a per-flow O-Cache, and a per-destination D-Cache, wherein when a data or control packet arrives a QoS router, the process in which the packet is forwarded is forwarded in a process comprising:

(a) when the packet arrives at a router, the source-destination IP addresses, source-destination port numbers and protocol identification in the packet header are used to distinguish data packet and control packet;

(b) if the packet is a control packet, forwards it to the control module to process and update the flow state database (FSDB), refresh the flow state if the packet belongs to existing flows, otherwise, the P-Cache and the residual bandwidth database (RBDB) are examined;

(c) if it is a best effort data packet, forwards it to the next-hop router by looking up the per-destination D-Cache whose shortest paths entries are pre-computed; and (d) if it is a QoS data packet, the O-Cache, the P-Cache and the D-Cache are simultaneously looked up, wherein the packet is forwarded to the next hop router according to the O-Cache entry if the O-Cache lookup is a hit, otherwise, the packet is forwarded according to the P-Cache entry if the P-Cache lookup is a hit, wherein ff the both lookups are misses, the packet is forwarded according to the D-Cache entry.

2. The design of scalable techniques for QoS routing and forwarding as defined in claim 1, wherein the P-Cache and a RBDB are examined and performs following steps, comprising:
   (a) using source-destination addresses of the packet to lookup the P-Cache entries;
   (b) if the P-Cache lookup is a hit, then a request bandwidth b is checked with the RBDB to ensure the QoS of the new flow, wherein if the check is successful, then the bandwidth is temporarily reserved for the new flow, and the flow will be forwarded according to the path on the P-Cache entry, on the other hand, if RBDB indicates that the residual bandwidth is not enough, the path computation function is invoked to find a QoS path based on the information in LSDB and RBDB, if a QoS path $\sigma$ is found, the forwarding information of this new flow is stored in the O-cache, which is overflowed to the O-cache, wherein if no path can be found, the flow is blocked; and
   (c) if the P-Cache lookup is a miss, this implies that no forwarding information is stored for the new flow, whereby the routing algorithm attempts to compute a QoS path, wherein if the path $\sigma$ is found, the algorithm stores the forwarding information in the P-cache, otherwise, it blocks the flow.

3. The design of scalable techniques for QoS routing and forwarding as defined in claim 1, wherein it also includes simultaneous use of a per-class routing mark technique, and is implemented in the following steps, comprising:
   (a) when the packet arrives at a router, the source-destination IP addresses, source-destination port numbers and protocol identification in the packet header are used to distinguish data packet and control packet;
   (b) if it is a control packet, forwards it to the control module to process and update the flow state database (FSDB), wherein in case of edge router and the flow is a new request, the C-Cache wherein O-Cache and P-Cache combination) and the residual bandwidth database (RBDB) are examined, that is, the algorithm uses the source-destination addresses of the control packet to extract the least costly feasible path $\pi$ and the index of sub-entry m from the C-Cache, wherein according to the number of sub-entries of the desired S-D pair, three cases are further discussed;
   (c) if it is a best effort data packet, forwards it to the next-hop router by looking up the per-destination D-Cache whose shortest paths entries are pre-computed; and
   (d) if it is a QoS data packet, indexing the S-D address pair and routing mark simultaneously look up the C-Cache and the D-Cache, wherein the packet is forwarded to the next hop router according to the C-Cache entry if the C-Cache lookup is a hit, otherwise, the packet is forwarded according to the D-Cache entry, wherein in case of edge router, the routing mark is retrieved from the flow state database and insert it into the packet header, then forwards the packet to the next hop router.

4. The design of scalable techniques for QoS routing and forwarding as defined in claim 3, wherein the three cases include:
   (a) if the number of sub-entries of the desired S-D pair in C-Cache is empty, the lookup is missed and the algorithm attempts to compute the least costly feasible path, termed $\sigma$, if $\sigma$ is found, the algorithm assigns a new mark to $\sigma$, inserts it into the C-Cache, and then updates the flow state database, wherein if $\sigma$ is not found, the flow is blocked;
   (b) if the number of sub-entries of the desired S-D pair in C-Cache is 'full', this algorithm simply finds the least costly feasible path $\pi$ among the existing $\Pi(s, d)$ paths, where $\pi \in \Pi(s, d)$, if $\pi$ is found, the flow is marked with the index of $\pi$, and thus update the flow state database, if $\pi$ is not found, then blocks the flow; and
   (c) if the number of sub-entries of the desired S-D, $\Pi(s, d)$, is neither empty nor full, this algorithm can either route the flow through the $\pi$ led by the C-Cache as in case 2, or route the flow through a newly computed path $\sigma$ as in case 1, whichever costs less, wherein no matter which is chosen, the flow state database is updated with the desired routing mark.

5. The design of scalable techniques for QoS routing and forwarding as defined in claim 1, wherein it also includes the simultaneous use of a path computation module and use of a two-phase routing technique, that is, when a data or control packet arrives a QoS router, the process in which the packet is forwarded, can be detailed as the following steps, comprising:
   (a) first, when the packet arrives at a router, the source-destination IP addresses, source-destination port numbers and protocol identification in the packet header are used to distinguish data packet and control packet;
   (b) if the packet is a control packet, forwards it to the control module to process and update the flow state database (FSDB), refresh the flow state if the packet belongs to existing flows, otherwise, use the S-D pair addresses to lookup the P-Cache and the residual bandwidth database (RBDB) is examined;
   (c) if it is a best effort data packet, forwards it to the next-hop router by looking up the per-destination D-Cache whose shortest paths entries are pre-computed; and
   (d) if it is a QoS data packet, the P-Cache and the D-Cache are simultaneously looked up, wherein the packet is forwarded to the next hop router according to the P-Cache entry if the P-Cache lookup is a hit, otherwise, the packet is forwarded according to the D-Cache entry.

6. The design of scalable techniques for QoS routing and forwarding as defined in claim 5, wherein using the S-D address pair to lookup the P-Cache includes implementing the following, comprising:
   (a) if the P-Cache lookup is a hit, and the feasibility check with RBDB is successful which means with enough residual bandwidth, then the flow will be forwarded through the path led by the P-Cache, wherein if there is not enough residual bandwidth, then the flow is blocked;
   (b) if the P-Cache lookup is a miss, this implies that no forwarding information is stored for the new flow, therefore, the two-phase routing technique is used to compute a feasible QoS path, wherein if the path $\sigma$ is found, the algorithm stores the forwarding information in the P-cache, otherwise, it blocks the flow.

7. The QoS route and forwarding extension design as defined in claim 5, wherein the path computation module is based on the following two-phase computation:
   (a) Phase-I, referred to as soft-reservation, tries to find a path $\sigma_1$ with greater bandwidth than the request b, that is where width$(\sigma_1) \geq b + b_{more}$, wherein the $b_{more}$ value can be roughly estimated and can be adjusted according to the traffic volume, path information of $\sigma$ is inserted into the P-Cache, and the soft-residual bandwidth is recorded into the soft-RBDB database, consequently, the subsequent incoming flows of the same S-D pair will be more likely to successfully reserve bandwidth on the minimum-hop path $\sigma_1$, less misleading will increase the likelihood of success; and (b) if a QoS path $\sigma_1$ cannot be found, Phase-II attempts to compute a path $\sigma_2$ with bandwidth b, that is, width($\sigma_2$) $\geq$b, referred to as hard-reservation because it considers the actual required bandwidth, path information of $\sigma_2$ is inserted into the P-Cache, and the hard-residual bandwidth is recorded into the hard-RBDB database, if QoS path $\sigma_2$ cannot be computed, the flow is blocked.

8. The design of scalable techniques for QoS routing and forwarding, using a per-class routing mark technique, comprising:

(a) first, when the packet arrives at a router, the source-destination IP addresses, source-destination port numbers and protocol identification in the packet header are used to distinguish data packet and control packet;

(b) if it is a control packet, forwards it to the control module to process and update the flow state database (FSDB), wherein it is noted that in case of edge router and the flow is a new request, the C-Cache, that is, O-Cache and P-Cache combination and the residual bandwidth database (RBDB) are examined, that is, the algorithm uses the source-destination addresses of the control packet to extract the least costly feasible path $\pi$ and the index of sub-entry m from the C-Cache, according to the number of sub-entries of the desired S-D pair, three cases will be further discussed;

(c) if it is a best effort data packet, forwards it to the next-hop router by looking up the per-destination D-Cache whose shortest paths entries are pre-computed; and (d) if it is a QoS data packet, indexing the S-D address pair and routing mark simultaneously look up the C-Cache and the D-Cache, wherein the packet is forwarded to the next hop router according to the C-Cache entry if the C-Cache lookup is a hit, otherwise, the packet is forwarded according to the D-Cache entry, wherein it is noted that in case of edge router, the routing mark must be retrieved from the flow state database and insert it into the packet header, then forwards the packet to the next hop router.

9. The design of scalable techniques for QoS routing and forwarding as defined in claim 8, wherein the three cases include:

(a) if the number of sub-entries of the desired S-D pair in C-Cache is 'empty', the lookup will be missed and the algorithm attempts to compute the least costly feasible path, termed $\sigma$, if $\sigma$ is found, the algorithm assigns a new mark to $\sigma$, inserts it into the C-Cache, and then updates the flow state database, and if $\sigma$ is not found, the flow is blocked;

(b) if the number of sub-entries of the desired S-D pair in C-Cache is 'full', this algorithm simply finds the least costly feasible path $\pi$ among the existing $\Pi$(s, d) paths, where $\pi \in \Pi$(s, d), if $\pi$ is found, the flow will be marked with the index of $\pi$, and thus update the flow state database, if $\pi$ is not found, then blocks the flow; and (c) If the number of sub-entries of the desired S-D, $\Pi$(s, d), is neither empty nor full, this algorithm can either route the flow through the $\pi$ led by the C-Cache as in case 2, or route the flow through a newly computed path $\sigma$ as in case 1, whichever costs less, wherein it is noted that no matter which is chosen, the flow state database is updated with the desired routing mark.

10. The design of scalable techniques for QoS routing and forwarding as defined in claim 8, wherein it further includes the simultaneous use of a path computation module and use of a two-phase routing technique, that is, when a data or control packet arrives a QoS router, the process in which the packet is forwarded, can be detailed as the following steps, comprising:

(a) first, when the packet arrives at a router, the source-destination IP addresses, source-destination port numbers and protocol identification in the packet header are used to distinguish data packet and control packet;

(b) if the packet is a control packet, forwards it to the control module to process and update the flow state database (FSDB), refresh the flow state if the packet belongs to existing flows, otherwise, use the S-D pair addresses to lookup the P-Cache and the residual bandwidth database (RBDB) is examined, (c) if it is a best effort data packet, forwards it to the next-hop router by looking up the per-destination D-Cache whose shortest paths entries are pre-computed; and (d) If it is a QoS data packet, the P-Cache and the D-Cache are simultaneously looked up, wherein the packet is forwarded to the next hop router according to the P-Cache entry if the P-Cache lookup is a hit, otherwise, the packet is forwarded according to the D-Cache entry.

11. The design of scalable techniques for QoS routing and forwarding as defined in claim 10, wherein using the S-D address pair to lookup the P-Cache includes implementing the following, comprising:

(a) if the P-Cache lookup is a hit, and the feasibility check with RBDB is successful, that is, with enough residual bandwidth, then the flow will be forwarded through the path led by the P-Cache, wherein if there is not enough residual bandwidth, then the flow is blocked;

(b) if the P-Cache lookup is a miss, this implies that no forwarding information is stored for the new flow, therefore, the two-phase routing technique is used to compute a feasible QoS path, if the path a is found, the algorithm stores the forwarding information in the P-cache, otherwise, it blocks the flow.

12. The QoS route and forwarding extension design as defined in claim 11, wherein the path computation module is based on the following two-phase computation:

(a) Phase-I, referred to as soft-reservation, tries to find a path $\sigma_1$ with greater bandwidth than the request b, that is where width($\sigma_1$)$\geq$b +$b_{more}$, the $b_{more}$ value can be roughly estimated and can be adjusted according to the traffic volume, path information of $\sigma_1$ is inserted into the P-Cache, and the soft-residual bandwidth is recorded into the soft-RBDB database, wherein consequently, the subsequent incoming flows of the same S-D pair will be more likely to successfully reserve bandwidth on the minimum-hop path $\sigma_1$, less misleading will increase the likelihood of success; and (b) if a QoS path $\sigma_1$ cannot be found, Phase-II will attempt to compute a path $\sigma_2$ with bandwidth b, that is, width ($\sigma_2$)$\geq$b, referred to as hard-reservation because it considers the actual required bandwidth, path information of $\sigma_2$ is inserted into the P-Cache, and the hard-residual bandwidth is recorded into the hard-RBDB database, if QoS path a2 cannot be computed, the flow is blocked.

13. The design of scalable techniques for QoS routing and forwarding as defined in claim 12, wherein using the S-D address pair to lookup the P-Cache includes implementing the following, comprising:

(a) if the P-Cache lookup is a hit, and the feasibility check with RBDB is successful, that is, with enough residual bandwidth, then the flow will be forwarded through the path led by the P-Cache, if there is not enough residual bandwidth, then the flow is blocked;

(b) if the P-Cache lookup is a miss, this implies that no forwarding information is stored for the new flow, therefore, the two-phase routing technique is used to compute a feasible QoS path, if the path σ is found, the algorithm stores the forwarding information in the P-cache, otherwise, it blocks the flow.

14. The design of scalable techniques for QoS routing and forwarding as defined in claim 13, wherein the P-Cache and a RBDB are examined and must perform the following steps, comprising:

(a) source-destination addresses of the packet are used to lookup the P-Cache entries;

(b) if the P-Cache lookup is a hit, then a request bandwidth b is checked with the RBDB to ensure the QoS of the new flow, if the check is successful, then the bandwidth is temporarily reserved for the new flow, and the flow will be forwarded according to the path on the P-Cache entry, on the other hand, if RBDB indicates that the residual bandwidth is not enough, the path computation function is invoked to find a QoS path based on the information in LSDB and RBDB, if a QoS path σ is found, the forwarding information of this new flow is stored in the O-cache, that is overflowed to the O-cache, if no path can be found. the flow is blocked; and (c) if the P-Cache lookup is a miss, this implies that no forwarding information is stored for the new flow, therefore, the routing algorithm attempts to compute a QoS path, if the path σ is found, the algorithm stores the forwarding information in the P-cache, otherwise, it blocks the flow.

15. The QoS route and forwarding extension design as defined in claim 10, wherein the path computation module is based on the following two-phase computation:

(a) Phase-I, referred to as soft-reservation, tries to find a path $\sigma_1$ with greater bandwidth than the request b, that is where width($\sigma_1$)≧b +$b_{more}$ the $b_{more}$ value can be roughly estimated and can be adjusted according to the traffic volume, path information of $\sigma_1$, is inserted into the P-Cache, and the soft-residual bandwidth is recorded into the soft-RBDB database, wherein consequently, the subsequent incoming flows of the same S-D pair will be more likely to successfully reserve bandwidth on the minimum-hop path $\sigma_1$, less misleading will increase the likelihood of success; and (b) if a QoS path $\sigma_1$, cannot be found, Phase-II will attempt to compute a path $\sigma_2$ with bandwidth b, that is, width($\sigma_2$)≧b, referred to as hard-reservation because it considers the actual required bandwidth, path information of $\sigma_2$ is inserted into the P-Cache, and the hard-residual bandwidth is recorded into the hard-RBDB database, if QoS path $\sigma_2$ cannot be computed, the flow is blocked.

16. The design of scalable techniques for QoS routing and forwarding, using a per-class routing mark technique, comprising: (a) first, when the packet arrives at a router, the source-destination IP addresses, source-destination port numbers and protocol identification in the packet header are used to distinguish data packet and control packet;

(b) if it is a control packet, forwards it to the control module to process and update the flow state database (FSDB), wherein it is noted that in case of edge router and the flow is a new request, the C-Cache, that is O-Cache and P-Cache combination and the residual bandwidth database (RBDB) are examined, that is, the algorithm uses the source-destination addresses of the control packet to extract the least costly feasible path π and the index of sub-entry m from the C-Cache, according to the number of sub-entries of the desired S-D pair, three cases will be further discussed;

(c) if it is a best effort data packet, forwards it to the next-hop router by looking up the per-destination D-Cache whose shortest paths entries are pre-computed; and (d) If it is a QoS data packet, indexing the S-D address pair and routing mark simultaneously look up the C-Cache and the D-Cache, the packet is forwarded to the next hop router according to the C-Cache entry if the C-Cache lookup is a hit, otherwise, the packet is forwarded according to the D-Cache entry, wherein it is noted that in case of edge router, the routing mark must be retrieved from the flow state database and insert it into the packet header, then forwards the packet to the next hop router.

17. The QoS route and forwarding extension design as defined in claim 16, wherein the path computation module is based on the following two-phase computation:

(a) Phase-I, referred to as soft-reservation, tries to find a path $\sigma_1$ with greater bandwidth than the request b, that is, where width($\sigma_1$)≧b +$b_{more}$ the $b_{more}$ value can be roughly estimated and can be adjusted according to the traffic volume, path information of $\sigma_1$ is inserted into the P-Cache, and the soft-residual bandwidth is recorded into the soft-RBDB database, wherein consequently, the subsequent incoming flows of the same S-D pair will be more likely to successfully reserve bandwidth on the minimum-hop path $\sigma_1$, less misleading will increase the likelihood of success; and (b) if a QoS path $\sigma_1$ cannot be found, Phase-II will attempt to compute a path $\sigma_2$ with bandwidth b, that is, width ($\sigma_2$)≧b, referred to as hard-reservation because it considers the actual required bandwidth, path information of $\sigma_2$ is inserted into the P-Cache, and the hard-residual bandwidth is recorded into the hard-RBDB database, if QoS path $\sigma_2$ cannot be computed, the flow is blocked.

18. The design of scalable techniques for QoS routing and forwarding as defined in claim 16, wherein it further includes using an overflowed cache technique, wherein the forwarding cache can be divided into three parts: a per-pair P-Cache, a per-flow O-Cache, and a per-destination D-Cache, wherein when a data or control packet arrives a QoS router, the process in which the packet is forwarded is forwarded in a process comprising:

(a) first, when the packet arrives at a router, the source-destination IP addresses, source-destination port numbers and protocol identification in the packet header are used to distinguish data packet and control packet;

(b) if the packet is a control packet, forwards it to the control module to process and update the flow state database (FSDB), refresh the flow state if the packet belongs to existing flows, otherwise, the P-Cache and the residual bandwidth database (RBDB) are examined;

(c)i if it is a best effort data packet, forwards it to the next-hop router by looking up the per-destination D-Cache whose shortest paths entries are pre-computed; and (d) if it is a QoS data packet, the O-Cache, the P-Cache and the D-Cache are simultaneously looked up, wherein the packet is forwarded to the next hop router according to the O-Cache entry if the O-Cache lookup is a hit, otherwise, the packet is forwarded according to the P-Cache entry if the P-Cache lookup is a hit, if the both lookups are misses, the packet is forwarded according to the D-Cache entry.

* * * * *